(12) United States Patent
Koga et al.

(10) Patent No.: US 9,083,164 B2
(45) Date of Patent: Jul. 14, 2015

(54) SUPPORT STRUCTURE FOR BOSS

(71) Applicant: Yazaki Corporation, Tokyo (JP)

(72) Inventors: Takeo Koga, Shizuoka (JP); Isanori Shimizu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 141 days.

(21) Appl. No.: 13/627,076

(22) Filed: Sep. 26, 2012

(65) Prior Publication Data

US 2013/0075131 A1    Mar. 28, 2013

(30) Foreign Application Priority Data

Sep. 27, 2011 (JP) ................................. 2011-210580

(51) Int. Cl.
*H02G 3/16* (2006.01)
*H02G 3/08* (2006.01)
(52) U.S. Cl.
CPC . *H02G 3/081* (2013.01); *H02G 3/16* (2013.01)
(58) Field of Classification Search
USPC .................................................. 361/728, 826
See application file for complete search history.

(56) References Cited

U.S. PATENT DOCUMENTS

| 3,953,120 | A | * | 4/1976 | Badalich et al. | ............... | 353/119 |
| 4,159,504 | A | * | 6/1979 | Cook | ............................ | 361/650 |
| 2003/0016489 | A1 | * | 1/2003 | Agata et al. | .................... | 361/683 |
| 2008/0117591 | A1 | | 5/2008 | Hashikura et al. | | |

FOREIGN PATENT DOCUMENTS

| CN | 101183775 A | | 5/2008 |
| JP | 7-276445 A | | 10/1995 |
| JP | 08-057885 A | | 3/1996 |
| JP | 2007-030970 A | | 2/2007 |
| JP | 2009-255470 A | | 11/2009 |
| JP | 2010-017069 A | | 1/2010 |
| JP | 2010017069 A | * | 1/2010 |
| JP | 2011-168191 A | | 9/2011 |
| KR | 20-1996-0018768 | | 6/1996 |

OTHER PUBLICATIONS

Communication dated Dec. 15, 2013, issued by the Korean Intellectual Property Office in corresponding Application No. 10-2012-0107725.

(Continued)

*Primary Examiner* — William H Mayo, III
*Assistant Examiner* — Krystal Robinson
(74) *Attorney, Agent, or Firm* — Sughrue Mion, PLLC

(57) ABSTRACT

There is provided a support structure for a boss of a resin molded product. A plurality of cylindrical bosses stands up from one surface of a base plate to support a component. A plurality of reinforcing ribs extends radially from an outer circumferential surface of at least one of the bosses. The reinforcing ribs are arranged so as to be spaced apart from each other at a regular interval in a circumferential direction of the at least one of the bosses. Building-up portions are formed only on corner portions in which the outer circumferential surface of the at least one of the bosses and the reinforcing ribs intersect with each other.

3 Claims, 9 Drawing Sheets

(56) References Cited

OTHER PUBLICATIONS

Notice of Allowance dated Jul. 31, 2014 issued by the Korean Intellectual Property Office in counterpart Korean Patent Application No. 10-2012-0107725.

Office Action dated Jun. 18, 2014, issued by the Korean Intellectual Property Office in counterpart Korean Application No. 10-2012-0107725.

Communication dated Jun. 26, 2014 from the State Intellectual Property Office of P.R. China in a counterpart application No. 201210369640.0.

Communication issued on Feb. 9, 2015 by The Patent Office of the PR of China in related application No. 201210369640.0.

Office Action issued Apr. 7, 2015, by the Japanese Patent Office in related Application No. 2011-210580.

* cited by examiner

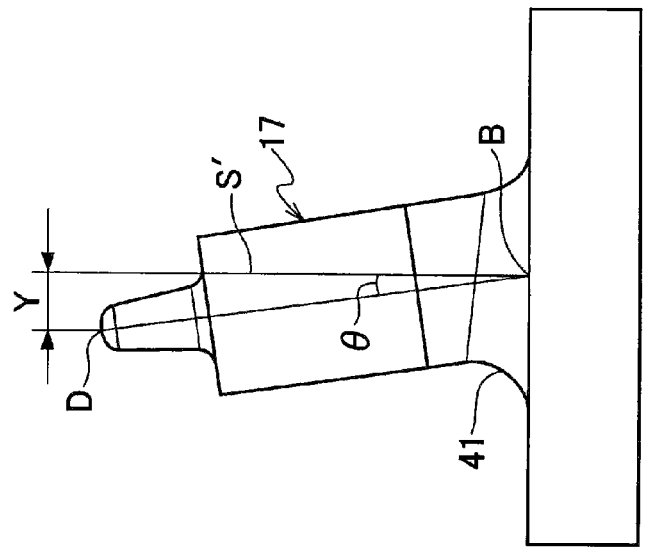
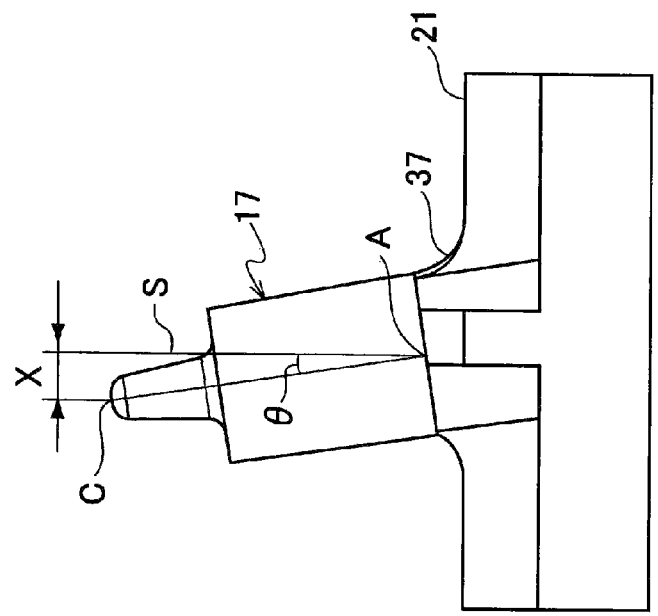

SUPPORT STRUCTURE FOR BOSS

The disclosure of Japanese Patent Application No. 2011-210580 filed on Sep. 27, 2011, including specification, drawings and claims is incorporated herein by reference in its entirety.

TECHNICAL FIELD

The present invention relates to a support structure for a boss of a resin molded product.

BACKGROUND

As an assembling member made from resin, there is known an electric connection box of an insert-molded type, in which a bus bar for an electric conduction path is insert-molded to form a wanted circuit pattern. The electric connection box includes, as illustrated in FIG. 8, a base plate 11 inserted with the bus bar, a frame body 13 standing up from one side of the base plate 11 and spaced apart from each other, and a connector housing 15 (e.g., see Patent Document 1). The frame body 13 is attached with a case to be assembled, or the like, and the connector housing 15 is configured to receive an external connection terminal of a circuit in the frame body 13.

The electric connection box is provided with a plurality of cylindrical bosses 17 standing up from one surface of the base plate 11 in the frame body 13. As illustrated in FIG. 9, a plurality of cylindrical components 19 is assembled to the frame body 13, in which a solenoid valve is received. Each of the components 19 is supported by front end portions (upper end in FIG. 9) of two bosses 17, and a predetermined posture thereof is secured by the base plate 11. As a result, each component is electrically connected to a terminal (not illustrated).

A root portion of the respective bosses 17 is provided with a plurality of reinforcing ribs 21 extending radially from an outer circumferential surface of the boss, and the reinforcing ribs 21 are disposed at a regular interval. Since the root portion of the boss 17 is reinforced by the ribs, even though the bosses 17 are pressed by the component 19 when the component 19 is assembled, the bosses 17 are not easily broken.

Patent Document 1: Japanese Patent Application Publication No. 2010-017069A

Since the electric connection box disclosed in Patent Document 1 is molded in the state in which the bus bar is inserted on the base plate 11, a flow of the resin is interrupted by the bus bar at molding, so that performance of filling spaces between the bosses 17 with the resin may be varied depending upon the space. If the filing performance is varied, the overall length of the boss 17 in an axial direction is varied among them. In particular, short shot of unfilling may occur in the boss 17 with the deteriorated filing performance.

Also, if the overall length of the boss 17 is varied among them, for example, a posture of the component 19 supported by the boss 17 is inclined to the base plate 11, when the components 19 are assembled. As a result, this may cause a defect such as electrical connection failure or malfunction. Further, when the components 19 are assembled, a load of the component 19 is applied to the boss 17 from an oblique direction to its axis, a stress is concentrated on a corner portion in which an outer circumferential surface of the boss 17 intersects with an upper surface of the reinforcing rib 21, so that a crack may be generated.

SUMMARY

It is thereof an object of the present invention is to improve dimensional accuracy of a boss and also prevent generation of a crack.

According to a first aspect of the embodiments of the present invention, there is provided a support structure for a boss of a resin molded product, comprising: a base plate; a plurality of cylindrical bosses standing up from one surface of the base plate to support a component; and a plurality of reinforcing ribs extending radially from an outer circumferential surface of at least one of the bosses, the reinforcing ribs arranged so as to be spaced apart from each other at a regular interval in a circumferential direction of the at least one of the bosses, wherein building-up portions are formed only on corner portions in which the outer circumferential surface of the at least one of the bosses and the reinforcing ribs intersect with each other.

Even though a stress is generated on a corner portion in which the outer circumferential of the boss intersects with the upper surface of the reinforcing rib, the stress can be dispersed by the installation of the building-up portion, thereby preventing generation of a crack. Also, since it is possible to reduce a flow resistance of the resin flowing at the corner portion in which the outer circumferential of the boss intersects with the upper surface of the reinforcing rib, filling performance of the boss is improved, and it is possible to prevent generation of short shot.

Since the outer circumferential surface of the boss has the corner portion which intersects with the base plate, in addition to the corner portion which intersects with the upper surface of the reinforcing rib, both corner portions are generally provided with the building-up portion to improve the dimensional accuracy of the boss. However, the building-up portion is likely to be sunk, and the boss may fall down by the sinking. For example, the corner portion, in which the outer circumferential surface of the boss intersects with the base plate, is provided with the building-up portion. If the sinking occurs in the building-up portion, the boss is inclined from the root portion, which interests with the base plate, of the boss.

By contrast, according to the present invention, since only the corner portion, in which the outer circumferential surface of the boss intersects with the base plate, is provided with the building-up portion, the region to be sunk is limited, and thus it is possible to reduce the sinking. Therefore, it is possible to suppress the boss from falling down due to the sinking. Also, even though the boss falls down by the sinking, the boss is inclined from a position higher than the upper surface of the reinforcing rib as its starting point. As a result, as compared to the case where the boss falls down by the sinking of the building-up portion which is provided on the corner portion in which the outer circumferential surface of the boss intersects with the base plate, it is possible to reduce an offset amount of the front end portion of the boss deviating from a vertical direction of the base plate. Accordingly, it is possible to suppress a variation in the overall length of the bosses in a direction perpendicular to the base plate, and thus it is possible to improve the dimensional accuracy.

Since the present invention can improve filling performance of the bosses by providing the building-up portion to a molded product including the base plate which is formed with a bus bar through insert molding, it is possible to prevent occurrence of a crack, and to improve the dimensional accuracy of the boss.

According to the present invention, it is possible to improve the dimensional accuracy of the boss and also prevent occurrence of the crack.

BRIEF DESCRIPTION OF THE DRAWINGS

In the accompanying drawings:

FIGS. 2A and 2B are diagrams illustrating a state in which sinking occurs on a building-up portion in the support structure for the boss according to the present invention, in which FIG. 2A is a side view, and FIG. 2B is a top view.

FIGS. 3A and 3B are diagrams illustrating a relationship between a position of the building-up portion and falling of the boss, in which FIG. 3A illustrates the support structure for the boss according to the present invention, and FIG. 3B illustrates the structure of the building-up portion installed at a corner portion in which an outer circumferential surface of the boss intersects with a base plate.

FIGS. 6A and 6B are diagrams illustrating a flow of resin in a mould, in which FIG. 6A illustrates the support structure for the boss according to the present invention, and FIG. 6B illustrates a structure in which the building-up portion in FIG. 6A is not installed.

DETAILED DESCRIPTION OF THE EMBODIMENTS

Figure 1:
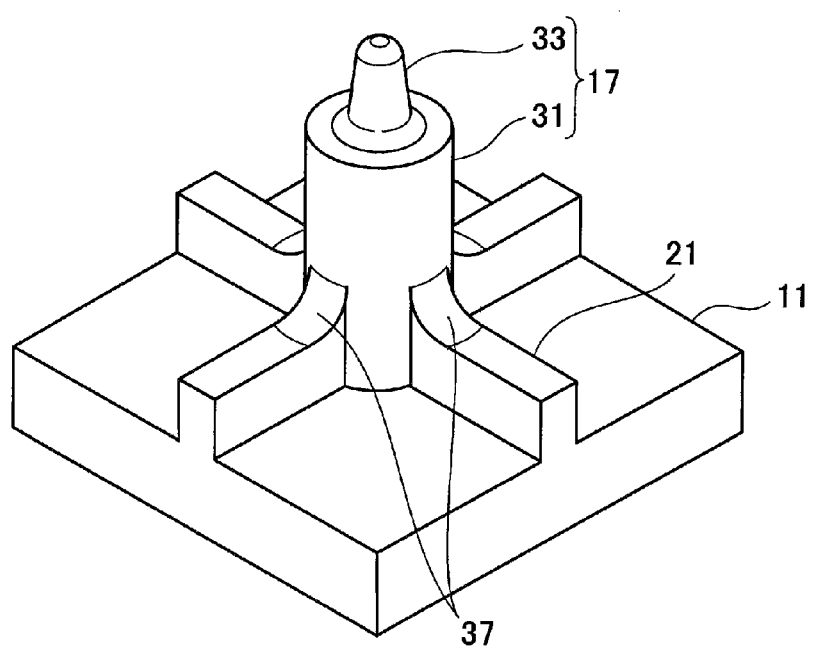
FIG. 1 is a perspective view illustrating a support structure for a boss according to the present invention.

Hereinafter, a support structure for a boss of a resin molded product according to one embodiment of the present invention will now be described with reference to the accompanying drawings. In this embodiment, the support structure for a boss 17 formed in an electric connection box illustrated in FIGS. 8 and 9 will be described. Also, in the following description, configurations other than the support structure for the boss are denoted by same reference numerals as those in FIGS. 8 and 9, and its detailed description will be omitted.

First, in order to easily understand the support structure for the boss 17 according to the present invention, the support structure for the boss 17 according to the related art will be described.

Figure 4:
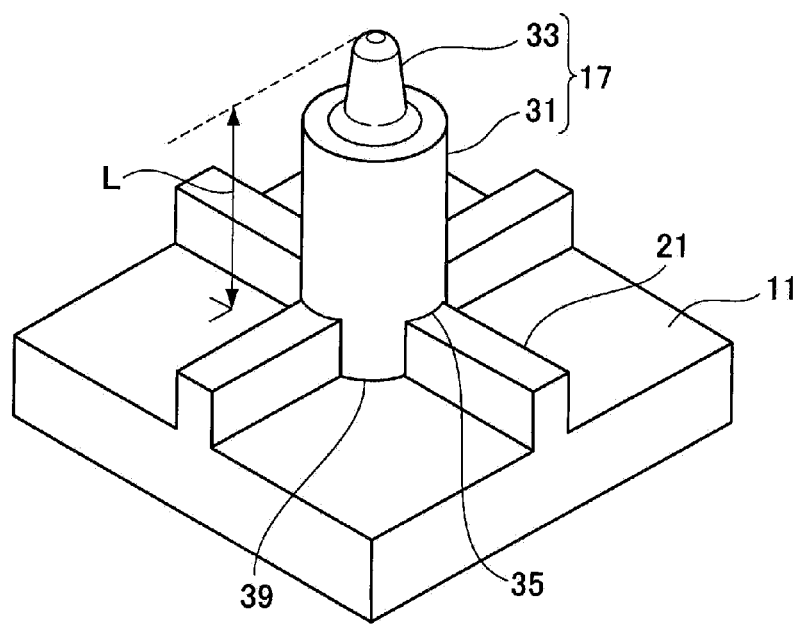
FIG. 4 is a perspective view illustrating a support structure for a boss according to the related art.
Figure 5:
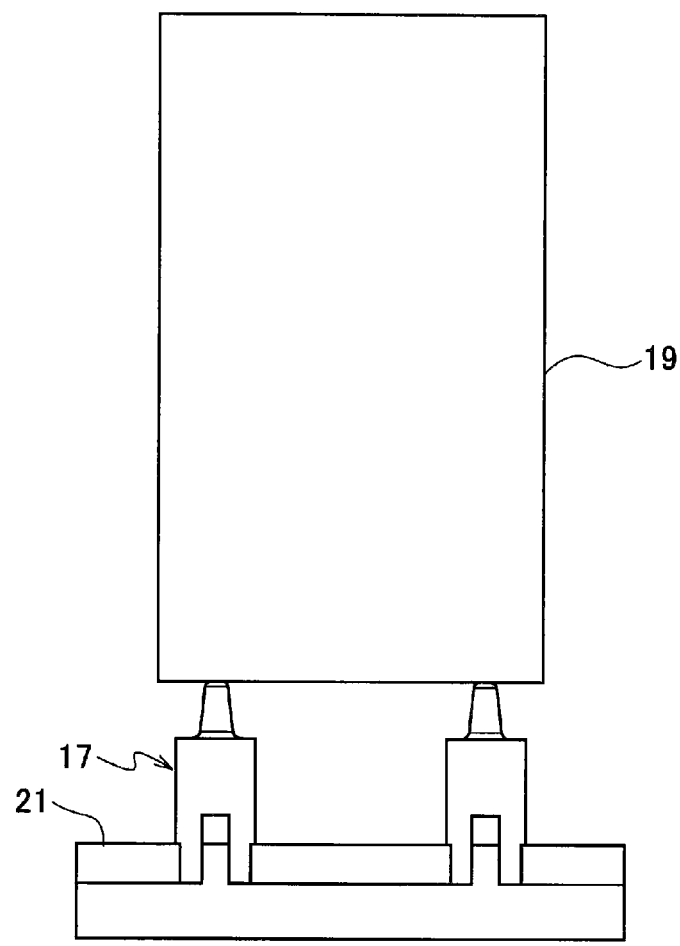
FIG. 5 is a side view illustrating a state in which the boss supports a component.
Figure 8:
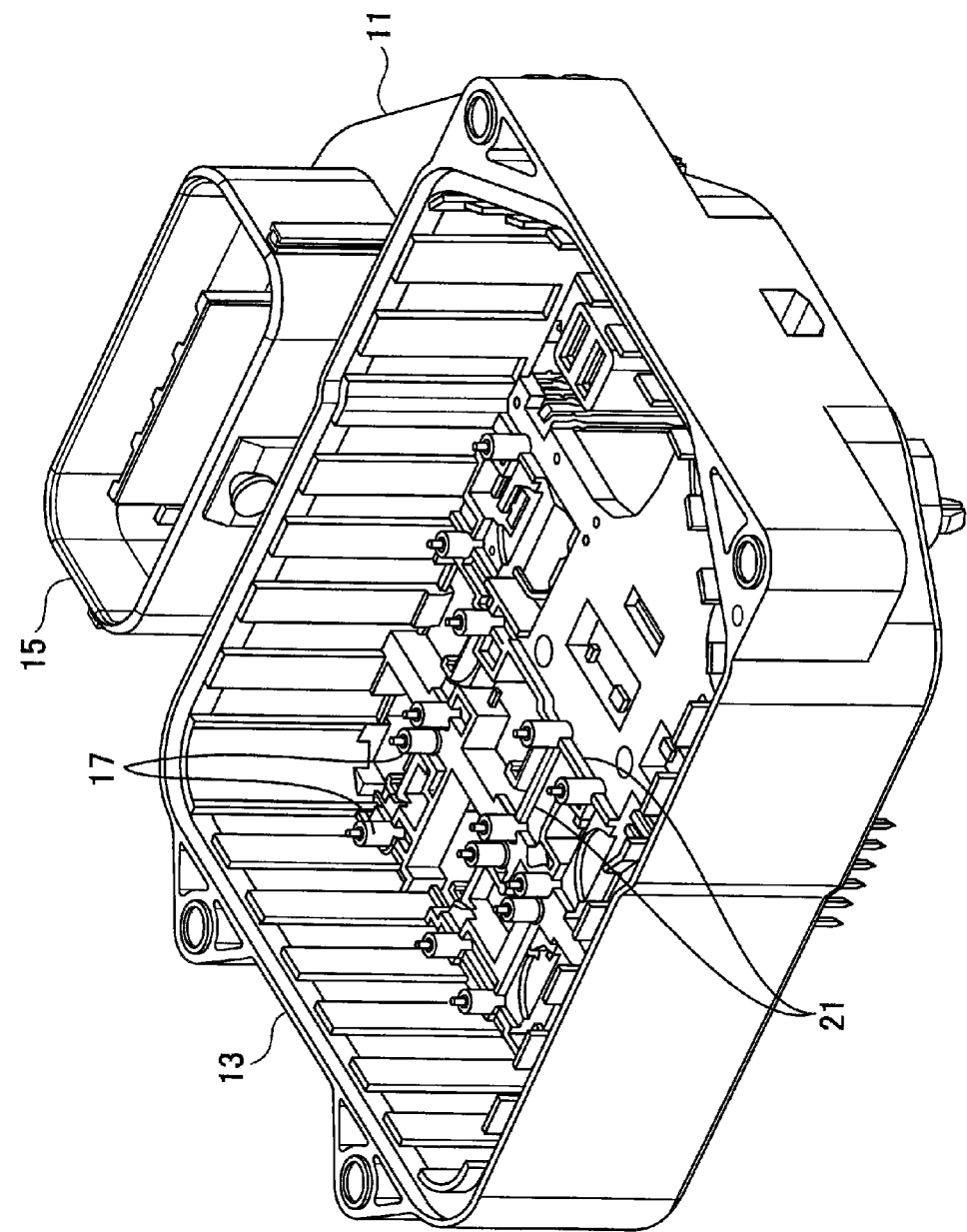
FIG. 8 is a perspective view illustrating an appearance of an electric connection box.
Figure 9:
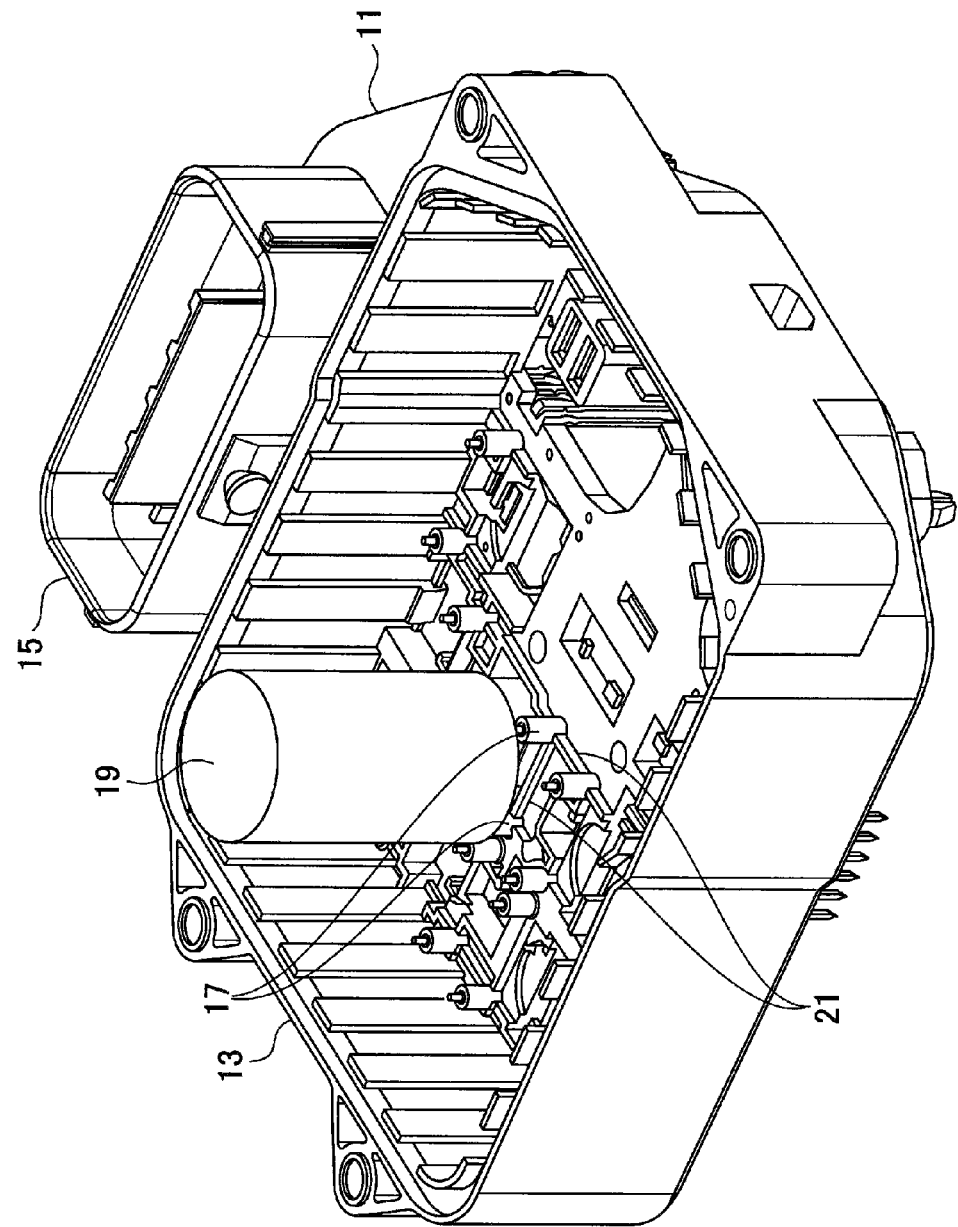
FIG. 9 is a perspective view illustrating a state in which a component is assembled to the electric connection box.

A base plate 11 forming a bottom surface of a frame body 13 is provided with a plurality of bosses 17 standing up from one surface thereof (FIG. 8). The boss 17 includes a body portion 31 formed in a cylindrical shape, and a cylindrical boss portion 33 coaxially extending from the body portion 31, as illustrated in FIG. 4. The body portion 31 and the boss portion 33 are formed such that its diameter is gradually decreased toward a front end portion (upward in FIG. 4) of the boss 17. The boss portion 33 has a cross section of an outer diameter smaller than that of the body portion 31. The boss 17 of this embodiment is set such that an overall axially extending length the body portion 31 and the boss portion 33, that is, an overall length L in a direction perpendicular to the base plate 11, is equal to each other. A plurality of components 19 is assembled in the frame body 13, and each component 19 is supported by the front end portion of two bosses 17 (FIG. 5).

The outer circumferential surface of the boss 17 is provided with four reinforcing ribs 21 which extend radially to the outside and are arranged in a regular interval in a circumferential direction. When the component 19 is assembled, the reinforcing rib 21 reinforces the boss 17 to prevent the boss 17 from being broken even though the load of the component 19 is applied to the boss 17.

In the electric connection box of this embodiment, a bus bar is insert-molded in the base plate 11 provided with the boss 17. In this kind of molded product, since a flow of the resin is interrupted by the bus bar when molding, performance of filling a space between the bosses 17 with the resin, that is, a difference in filing density may easily occur. If the filling performance of the boss 17 is deteriorated, short shot of unfilling may occur in the boss portion 33 or the like. Even though the short shot does not occur, the overall length L of the bosses 17 may not be equal to each other. If the overall length L of the bosses 17 is not equal, for example, when the components 19 are assembled, the load of the component 19 is applied to the boss 17 from an oblique direction to its axial direction. As a result, a stress is concentrated on a corner portion 35 in which the outer circumferential of the boss 17 intersects with an upper surface of the reinforcing rib 21, so that a crack may be generated. In order to prevent formation of the crack, a method is conceivable in which a building-up portion, for example, a surface R or C, is installed to disperse the stress applied to the boss 17.

Figure 6A:
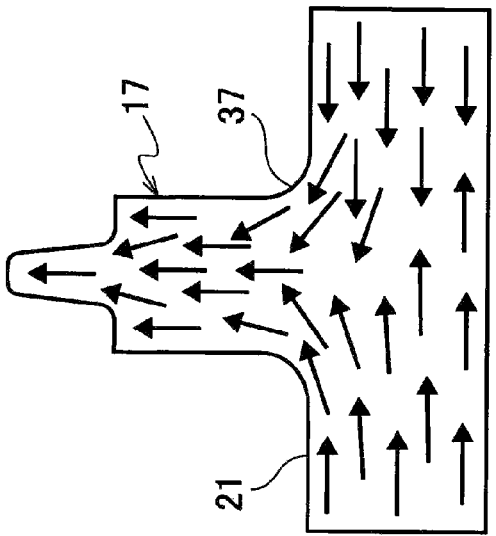
Figure 6B:
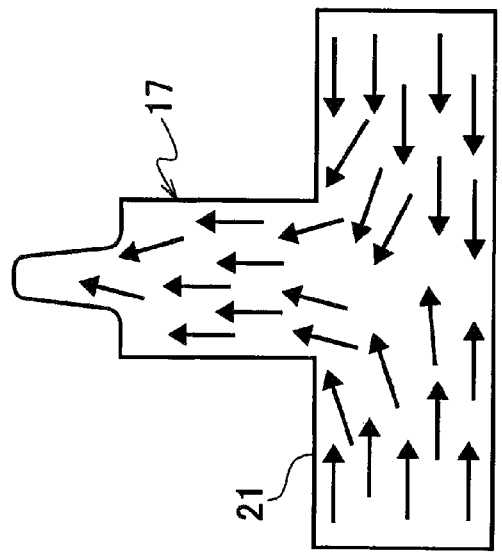

In order to improve the filling performance of the bosses 17 and reduce the difference of the filling density of the bosses 17, it is effective to provide the corner portion 35 of the respective bosses 17 with the building-up portion. For example, as illustrated in FIG. 6A, as a building-up portion 37 is provided at the corner portion 35 in which the outer circumferential surface of the boss 17 intersects with the upper surface of the reinforcing rib 21, the resin smoothly flows in the bosses 17 via the building-up portion 37, flow resistance of the resin can be decreased, as compared to the case in which the building-up portion 37 in FIG. 6B is not provided. As a result, the filling performance of the bosses 17 can be improved, and dimensional accuracy also can be improved.

The boss 17 has the corner portion 35 intersecting with the upper surface of the reinforcing rib 21, and the corner portion 39 intersecting with the base plate 11. For this reason, in order to improve the filling performance of the boss 17 and the dimensional accuracy of the boss 17, the corner portion 39 is generally built up to be wider than the corner portion 35, in addition to the corner portion 35 or instead of the corner portion 35.

Figure 7A:
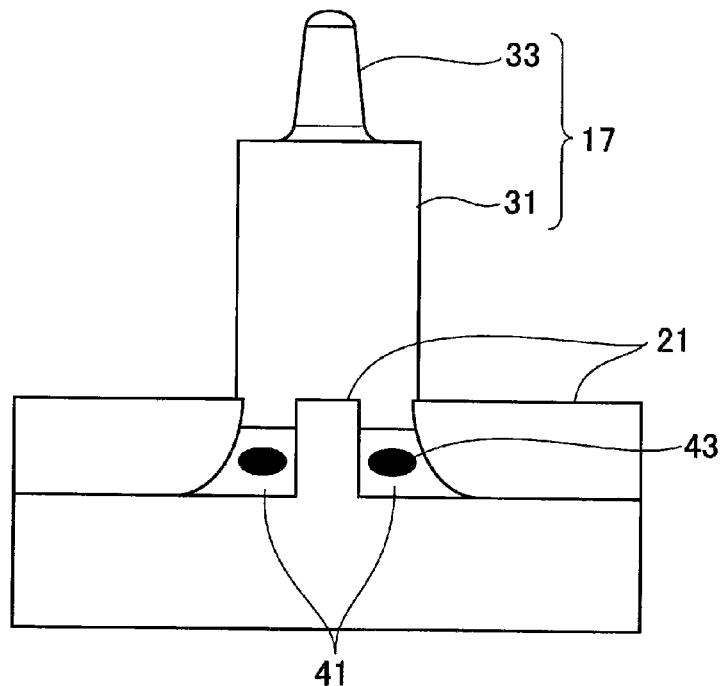
FIGS. 7A and 7B are diagrams illustrating a state in which sinking occurs in the corner portion in which the outer circumferential surface of the boss intersects with the base plate.
Figure 7B:
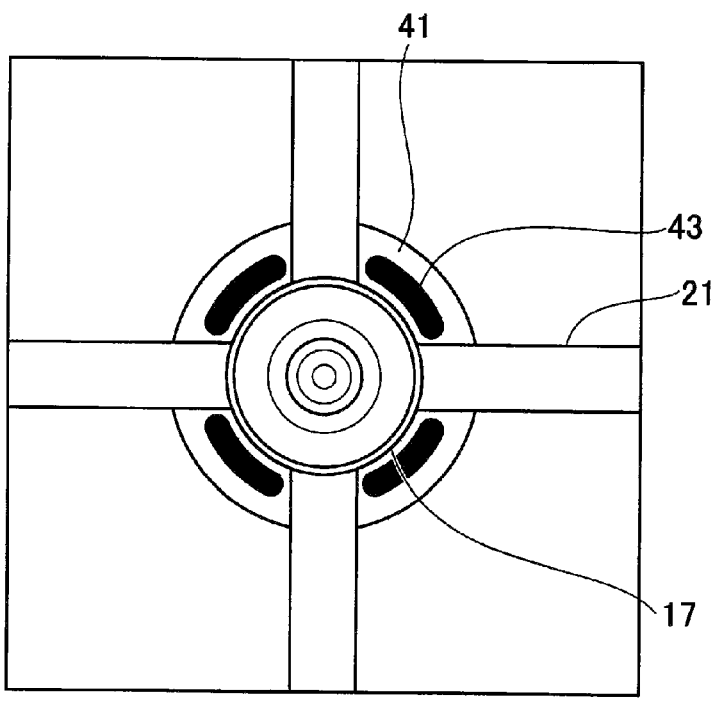

However, if the molded product is build up, as the thickness of the molded product is increased, the sinking easily occurs. For this reason, as illustrated in FIG. 7A, for example, in the case where the corner portion 39 is provided with a building-up portion 41, a relatively large sinking portion 43 is formed in a circumferential direction of the building-up portion 41, as illustrated in FIG. 7B. If the sinking portion 43 is formed, the boss 17 is affected by the sinking portion 43, so that the boss 17 possibly falls down from a root portion, which intersects with the base plate 11, in any direction with respect to the vertical direction of the base plate 11.

The support structure for the boss 17 according to this embodiment will now be described.

In this embodiment, as illustrated in FIG. 1, the corner portion 35, in which the outer circumferential surface of the boss 17 intersects with the upper surface of the reinforcing rib 21, is provided with the building-up portion 37, and the corner portion 39 intersecting with the base plate 11 is not built up. The building-up portion 37 is provided with the surface R having a predetermined curvature over the upper surface of the reinforcing rib 21 from the outer circumferential surface of the boss 17, but the present invention is not limited thereto. For example, the building-up portion may be provided with the surface C.

Figure 2A:
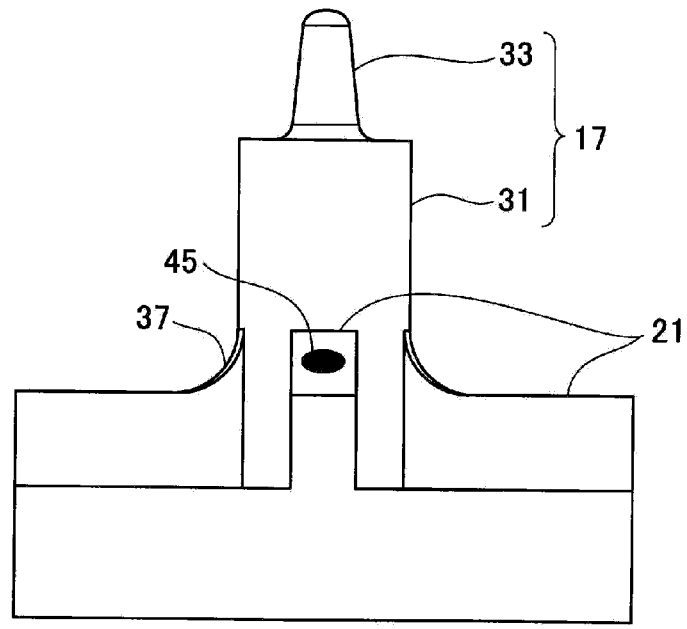
Figure 2B:
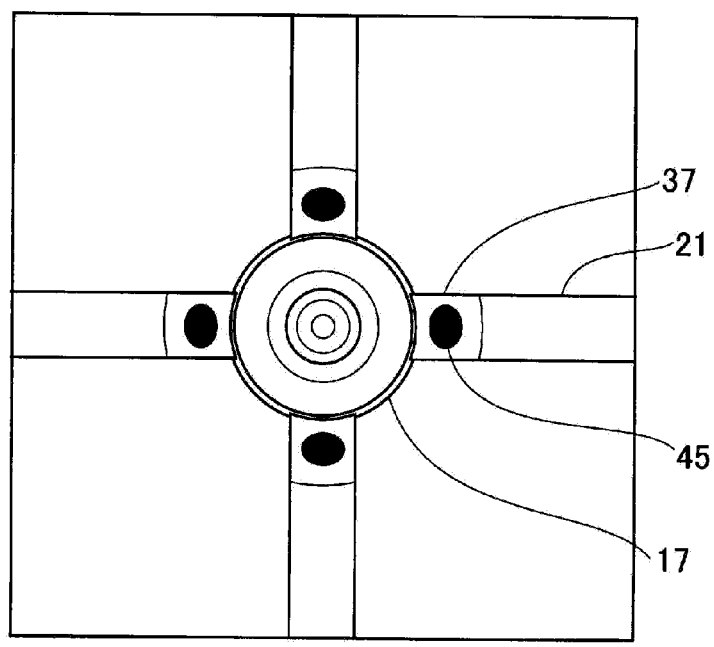

Since the region, in which the building-up portion 37 of this embodiment is formed, is defined in a relatively narrow region on the upper surface of the reinforcing rib 21 in the circumferential direction of the boss 17, as illustrated in FIGS. 2A and 2B, it is possible to suppress a size of the sinking portion 45 relatively smaller than the case where the corner portion 39, in which the outer circumferential surface of the boss 17 intersects with the base plate 11, is built up.

As illustrated in FIG. 3A, in the case where the portion, in which the outer circumferential surface of the boss 17 intersects with the upper surface of the reinforcing rib 21, is provided with the building-up portion 37, if the sinking portion 45 is formed in the building-up portion 37, the boss 17 falls down from a point A as it starting point rather than the upper surface of the reinforcing rib 21. By contrast, as illustrated in FIG. 3B, in the case where the portion, in which the outer circumferential surface of the boss 17 intersects with the base plate 11, is provided with the building-up portion 41, if the sinking portion is formed in the building-up portion 41, the boss 17 falls down from a point B of the root portion as it starting point.

Since a distance connecting the point A and a point C on the center of the front end portion of the boss 17 in FIG. 3A is shorter than a distance connecting the point B and a point D on the center of the front end portion of the boss 17 in FIG. 3B, in the case where angles θ of the bosses 17 in FIGS. 3A and 3B falling down from an axis S of the boss 17 perpendicular to the base plate 11 are equal to each other, a distance X of the point C deviated from the axis S in the direction perpendicular to the axis S is shorter than a distance Y of the point D deviated from an axis S' in a direction perpendicular to the axis S'. Accordingly, like this embodiment, it is possible to suppress the variation in overall length L between the bosses 17 by providing the building-up portion 37 only, without providing the building-up portion 41.

As described above, the support structure for the boss 17 of the related art is provided with the building-up portion 37 in this embodiment. Since the filling performance of the resin to the boss 17 is improved by providing the building-up portion 37, it is possible to prevent the short shot from being formed on the boss 17. Also, in this embodiment, the region, in which the outer circumferential surface of the boss 17 intersects with the base plate 11, is not provided with the building-up portion 41, but only the narrow region which interests with the upper surface of the reinforcing rib 21 is provided with the building-up portion 37. Therefore, the possibility in which the sinking portion occurs can be reduced, and it is possible to suppress the boss 17 from falling down due to the sinking portion.

Also, in this embodiment, even though the boss 17 falls down by occurrence of the sinking, the position serving as the starting point in which the boss falls down can be shifted to the front end side of the boss 17, as compared to the case where the region, in which the outer circumferential surface of the boss 17 intersects with the base plate 11, is provided with the building-up portion. Therefore, it is possible to suppress the variation in the overall length L between the bosses 17 due to the sinking, thereby improving the dimension accuracy. Accordingly, when the component 17 is assembled, it is possible to prevent the boss 17 from being broken, even though the load of the component 19 is applied to the boss 17. Further, since the posture of the component 19 is reliably maintained, the malfunction of a solenoid valve can be prevented.

Hereinafter, the embodiment of the present invention has been described in detail with reference to the accompanying drawings, but the embodiment is merely exemplary. The present invention is not limited to the configuration of the embodiment. Modifications of design thereof may be made without departing from the spirit or scope of the invention as defined by the appended claims.

For example, an example has been described in this embodiment, in which the plurality of bosses 17 is formed on one surface of the base plate 11 with the bus bar insert-molded therein, but the present invention is not limited thereto. Since the base plate is formed with a through-hole or through-window, the support structure of the present invention may be applied to the bosses to be formed on a base plate including a structure which prevents the flow of the resin, or a base plate which is not formed through the insert molding.

What is claimed is:

1. A support structure for a boss of a resin molded product, comprising:
   a base plate;
   a plurality of cylindrical bosses standing up from one surface of the base plate to support a component; and
   a plurality of reinforcing ribs extending radially from an outer circumferential surface of at least one of the bosses, the reinforcing ribs arranged so as to be spaced apart from each other at a regular interval in a circumferential direction of the at least one of the bosses;
   wherein building-up portions are formed only on corner portions in which the outer circumferential surface of the at least one of the bosses and the reinforcing ribs intersect with each other,
   wherein the boss includes a body portion formed in a cylindrical shape and a cylindrical boss portion formed in a cylindrical shape and coaxially extending from the body portion, and
   wherein only the tip end of the cylindrical boss portion is crushed when a component is assembled.

2. The support structure for the boss according to claim 1, wherein the base plate is provided with a bus bar through insert molding.

3. The support structure for the boss according to claim 1, wherein the building-up portions are provided with an upper surface having a curvature over the reinforcing ribs to the outer circumference of the boss.

* * * * *